(12) United States Patent
Novlan et al.

(10) Patent No.: US 9,717,094 B2
(45) Date of Patent: Jul. 25, 2017

(54) METHOD AND APPARATUS FOR DEVICE-TO-DEVICE COMMUNICATION

(71) Applicant: Samsung Electronics Co., Ltd., Suwon-si, Gyeonggi-do (KR)

(72) Inventors: Thomas David Novlan, Dallas, TX (US); Young-Han Nam, Plano, TX (US); Boon Loong Ng, Dallas, TX (US)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 236 days.

(21) Appl. No.: 14/500,463

(22) Filed: Sep. 29, 2014

(65) Prior Publication Data
US 2015/0092710 A1 Apr. 2, 2015

Related U.S. Application Data

(60) Provisional application No. 61/885,385, filed on Oct. 1, 2013.

(51) Int. Cl.
*H04W 4/00* (2009.01)
*H04W 72/12* (2009.01)
(Continued)

(52) U.S. Cl.
CPC ....... *H04W 72/1278* (2013.01); *H04L 5/0005* (2013.01); *H04L 5/0053* (2013.01); *H04W 76/023* (2013.01)

(58) Field of Classification Search
CPC ..... H04W 76/02; H04W 8/005; H04W 84/18; H04W 76/023; H04L 29/12; H04L 29/12207; H04L 61/20; H04L 67/12
See application file for complete search history.

(56) References Cited

U.S. PATENT DOCUMENTS

2012/0114014 A1* 5/2012 Gaal ............... H04B 7/0404 375/135
2014/0269558 A1* 9/2014 Sartori ............ H04W 48/16 370/329
(Continued)

FOREIGN PATENT DOCUMENTS

KR EP2858386 A2 * 4/2015 ............ H04W 4/06

OTHER PUBLICATIONS

3GPP TS 36.211; ETSI TS 136 211 V11.2.0; Technical Specification; LTE; Evolved Universal Terrestrial Radio Access (E-UTRA); Physical channels and modulation; Apr. 2013; 111 pgs.
(Continued)

*Primary Examiner* — Yemane Mesfin
*Assistant Examiner* — Abdelillah Elmejjarmi

(57) ABSTRACT

A method includes scheduling at least one resource for a Device-to-Device (D2D) transmission control channel (DCCH) carrying a D2D control information (D2DCI) message, transmitting, by a first UE, the DCCH on the at least one DCCH resource to at least one second UE, scheduling at least one resource for a D2D data channel (DDCH), and transmitting, by the first UE, the DDCH on the at least one DDCH resource to the at least one second UE. A UE includes one or multiple antenna, and a processing circuitry configured to schedule at least one resource for a DCCH, transmit the DCCH on the at least one DCCH resource, to at least one second UE through the one or more multiple antenna, schedule at least one resource for a DDCH, and transmit the DDCH on the at least one DDCH resource, to the at least one second UE.

24 Claims, 7 Drawing Sheets

(51) Int. Cl.
*H04L 5/00* (2006.01)
*H04W 76/02* (2009.01)

(56) References Cited

U.S. PATENT DOCUMENTS

2014/0321423 A1* 10/2014 Kalhan .............. H04W 76/023
370/330
2016/0174194 A1* 6/2016 Suzuki ................ H04W 48/00
370/312

OTHER PUBLICATIONS

3GPP TS 36.212; ETSI TS 136 212 V11.2.0; Technical Specification; LTE; Evolved Universal Terrestrial Radio Access (E-UTRA); Multiplexing and channel coding; Apr. 2013; 84 pgs.
3GPP TS 36.213; ETSI TS 136 213 V11.2.0; Technical Specification; LTE; Evolved Universal Terrestrial Radio Access (E-UTRA); Physical layer procedures; Apr. 2013; 175 pgs.
3GPP TS 36.214; ETSI TS 136 214 V11.1.0; Technical Specification; LTE; Evolved Universal Terrestrial Radio Access (E-UTRA); Physical layer; Measurements; Feb. 2013; 16 pgs.
3GPP TS 36.300; ETSI TS 136 300 V11.5.0; Technical Specification; LTE; Evolved Universal Terrestrial Radio Access (E-UTRA); and Evolved Universal Terrestrial Radio Access Network (E-UTRAN); Overall description; Stage 2; Apr. 2013; 223 pgs.
3GPP TS 36.321; ETSI TS 136 321 V11.2.0; Technical Specification; LTE; Evolved Universal Terrestrial Radio Access (E-UTRA); Medium Access Control (MAC) protocol specification; Apr. 2013; 58 pgs.
3GPP TS 36.331; ETSI TS 136 331 V11.3.0; Technical Specification; LTE; Evolved Universal Terrestrial Radio Access (E-UTRA); Radio Resource Control (RRC); Protocol specification; Apr. 2013; 348 pgs.
3GPP TSG RAN Meeting #58; "Study on LTE Device to Device Proximity Services"; RP-122009; Qualcomm Incorporated; 6 pages.

* cited by examiner

METHOD AND APPARATUS FOR DEVICE-TO-DEVICE COMMUNICATION

CROSS-REFERENCE TO RELATED APPLICATION AND CLAIM OF PRIORITY

This application claims priority under 35 U.S.C. §119(e) to U.S. Provisional Patent Application No. 61/885,385 filed on Oct. 1, 2013 entitled "DEVICE-TO-DEVICE BROADCAST COMMUNICATION CHANNEL DESIGN". The above-identified provisional patent application is hereby incorporated by reference in its entirety.

TECHNICAL FIELD

This disclosure relates generally to wireless communication systems. More specifically, this disclosure relates to a protocol for device-to-device (D2D) communications.

BACKGROUND

Traditionally, cellular communication networks have been designed to establish wireless communication links between mobile devices and fixed communication infrastructure components (such as base stations or access points) that serve users in a wide or local geographic range. However, a wireless network can also be implemented utilizing only device-to-device (D2D) communication links without the need for fixed infrastructure components. This type of network is typically referred to as an "ad-hoc" network. A hybrid communication network can support devices that connect both to fixed infrastructure components and to other D2D-enabled devices.

D2D communication may be used to implement many kinds of services that are complementary to the primary communication network or provide new services based on the flexibility of the network topology. D2D multicast communication such as broadcasting or groupcasting is a potential means for D2D communication where mobile devices are able to transmit messages to all in-range D2D-enabled mobile devices or a subset of mobile devices which are members of particular group. Additionally networks may require devices to operate in near simultaneous fashion when switching between cellular and D2D communication modes. As a result, there is a need for protocols which can manage D2D communication in these hybrid deployment scenarios.

SUMMARY

This disclosure provides a protocol for device-to-device (D2D) communications.

A method includes scheduling at least one resource for a Device-to-Device (D2D) transmission control channel (DCCH) carrying a D2D control information (D2DCI) message, transmitting, by a first UE, the DCCH on the at least one DCCH resource to at least one second UE, scheduling at least one resource for a D2D data channel (DDCH), and transmitting, by the first UE, the DDCH on the at least one DDCH resource to the at least one second UE.

In some embodiments, the DDCH comprises a D2D broadcast channel (DBCH).

In some embodiments, the method further includes configuring a set of potential resources for DCCH, listening on the set of the potential DCCH resources to detect a transmission, in a case where the transmission is not detected, or a power of the transmission is below a given threshold, selecting a subset of the set of potential DCCH resources as the at least one DCCH resource, in a case where the transmission is detected, or a power of the transmission is above the given threshold, configuring a backoff timer indicating a number of time units or slots wherein the UE will not attempt to contend for the DCCH.

In some embodiments, the subset of the set of potential DCCH resources is predefined or configured or indicated via higher layer signaling (DSIB).

In some embodiments, subsets of the set of potential DCCH resources are indexed in an order of frequency, and the subset selection starts from one of: the lowest index, the highest index, a randomly selected index, and an index that is configured based on a higher layer configuration or a D2D identification (ID).

In some embodiments, at least one of the DCCH and the DDCH is configured according to a time and frequency hopping pattern defined by time and frequency hopping parameters.

In some embodiments, sets of the time and frequency parameters correspond to a range of D2D ID values.

In some embodiments, either of a higher layer and a L1 layer signals one or multiple higher layer configuration parameters indicating whether each of the DCCH and DDCH have a time and frequency hopping pattern separately.

In some embodiments, the multiple configuration parameters comprise a first higher layer parameter indicating whether a time and frequency hopping configuration applies to the DCCH, and a second higher layer configuration parameter indicating whether a time and frequency hopping configuration applies to the DDCH.

In some embodiments, the multiple higher layer configuration parameters comprise a frequency hopping pattern indicator and a time hopping pattern indicator for DCCH, and a time hopping pattern indicator and a frequency hopping pattern indicator for DDCH.

A user equipment (UE) configured for D2D communications includes one or multiple antenna, and a processing circuitry configured to schedule at least one resource for a Device-to-Device (D2D) transmission control channel (DCCH) carrying a D2D control information (D2DCI) message, transmit the DCCH on the at least one DCCH resource, to at least one second UE through the one or more multiple antenna, schedule at least one resource for a D2D data channel (DDCH), and transmit the DDCH on the at least one DDCH resource, to the at least one second UE.

A UE configured for D2D communications includes one or more multiple antenna, and a processing circuitry configured to receive at least one resource for a DCCH carrying a D2DCI message through the one or more multiple antenna from a first UE, receive at least one resource for a DDCH based on DCCH through the one or more multiple antenna from the first UE, and demodulate and decode at least one DDCH resource, using the D2DCI message.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that, in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of this disclosure may be implemented in any suitably arranged device or system.

The following documents and standards descriptions are hereby incorporated into the present disclosure as if fully set forth herein: 3GPP Technical Specification No. 36.211, version 11.2.0 ("REF1"); 3GPP Technical Specification No. 36.212, version 11.2.0 ("REF2"); 3GPP Technical Specification No. 36.213, version 11.2.0 ("REF3"); 3GPP Technical Specification No. 36.214, version 11.1.0 ("REF4"); 3GPP Technical Specification No. 36.300, version 11.5.0 ("REF5"); 3GPP Technical Specification No. 36.321, version 11.2.0 ("REF6"); 3GPP Technical Specification No. 36.331, version 11.3.0 ("REF7"); and 3GPP Document No. RP-122009, "Study on LTE Device to Device Proximity Services" ("REF8").

Figure 1:
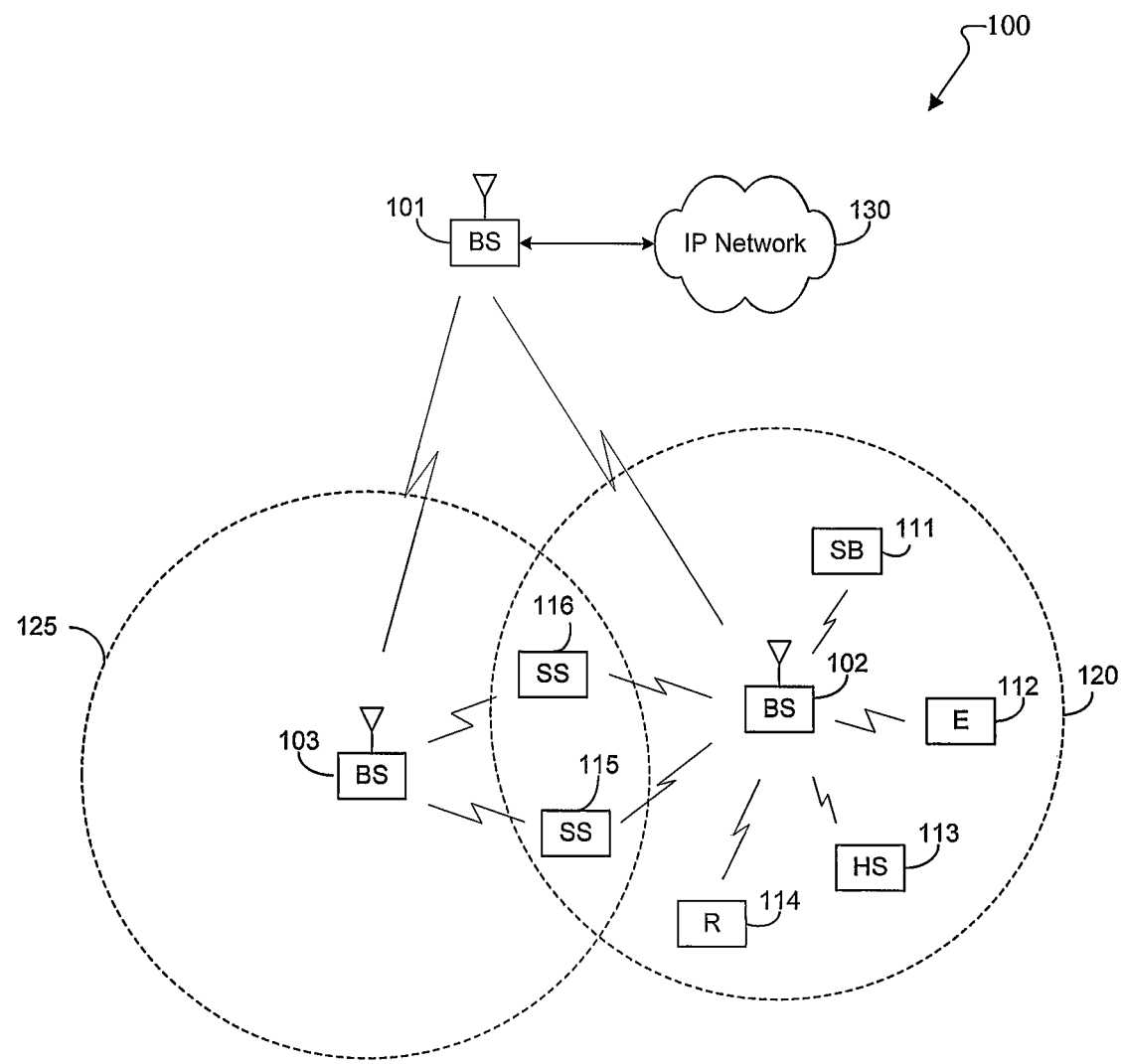
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipment (UEs) within a coverage area of the eNB 102. The first plurality of UEs includes a UE 111, which can be located in a small business (SB); a UE 112, which can be located in an enterprise (E); a UE 113, which can be located in a WiFi hotspot (HS); and a UE 114, which can be a mobile device (M) like a cell phone, wireless laptop, wireless PDA, or the like. The eNB 103 provides wireless broadband access to the network 130 for a second plurality of UEs within a coverage area of the eNB 103. The second plurality of UEs includes a UE 115 and a UE 116, which can be mobile devices (M). In some embodiments, one or more of the eNBs 101-103 can communicate with each other and with the UEs 111-116 using 5G, LTE, LTE-A, WiMAX, or other advanced wireless communication techniques.

Various UEs 111-116 could also support device-to-device (D2D) communications in which the UEs communicate directly with one another. In this manner, the network 100 represents a hybrid communication network that allows a UE to connect both to a fixed infrastructure component (such as an eNB 101-103) and to other D2D-enabled UEs.

Dotted lines show the approximate extents of the coverage areas of two cells 120 and 125, which are shown as approximately circular for the purposes of illustration and explanation only. It should be clearly understood that the cells 120 and 125 associated with the eNBs 102-103 can have other shapes, including irregular shapes, depending upon the configuration of the eNBs and variations in the radio environment associated with natural and man-made obstructions.

As described in more detail below, components of the wireless network 100 (such as the eNBs 101-103 and the UEs 111-116) support a device-to-device communications protocol. Among other things, the device-to-device communications protocol allows UEs 111-116 to engage in D2D communications possibly in parallel with normal operations of the eNBs 101-103 and with devices connected to the eNBs 101-103.

Although FIG. 1 illustrates one example of a wireless network 100, various changes can be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
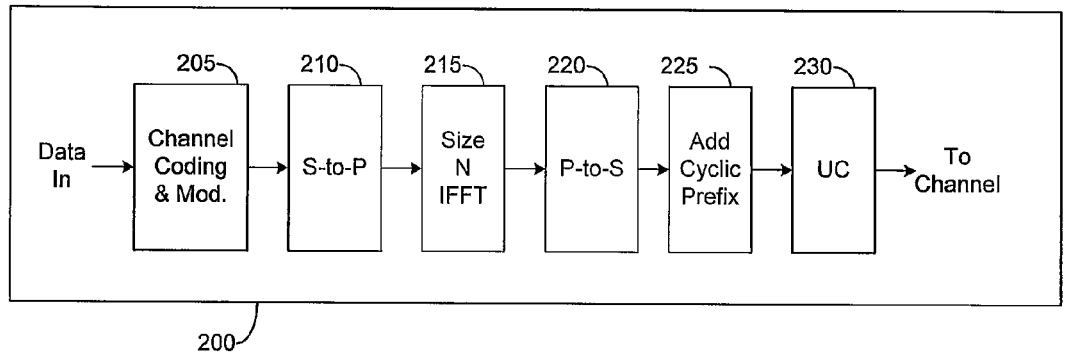
FIGS. 2A and 2B illustrate an example user equipment (UE) according to this disclosure.
Figure 2B:
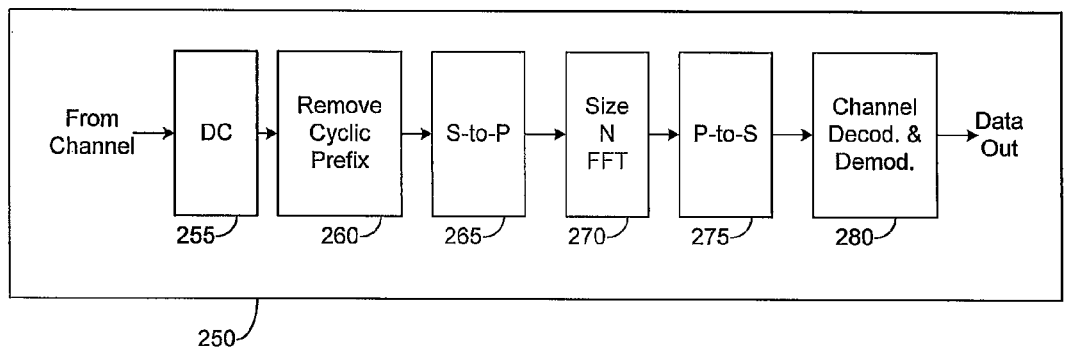

FIG. 2 illustrates an example UE 114 according to this disclosure. The embodiment of the UE 114 illustrated in FIG. 2 is for illustration only, and the other UEs in FIG. 1 could have the same or similar configuration. However, UEs come in a wide variety of configurations, and FIG. 2 does not limit the scope of this disclosure to any particular implementation of a UE.

As shown in FIG. 2, the UE 114 includes an antenna 205, a radio frequency (RF) transceiver 210, transmit (TX) processing circuitry 215, a microphone 220, and receive (RX) processing circuitry 225. The UE 114 also includes a speaker 230, a main processor 240, an input/output (I/O) interface (IF) 245, a keypad 250, a display 255, and a memory 260. The memory 260 includes a basic operating system (OS) program 261 and one or more applications 262.

The RF transceiver 210 receives, from the antenna 205, an incoming RF signal transmitted by an eNB or another UE. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the main processor 240 for further processing (such as for web browsing data).

The TX processing circuitry 215 receives analog or digital voice data from the microphone 220 or other outgoing baseband data (such as web data, e-mail, or interactive video game data) from the main processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna 205.

The main processor 240 can include one or more processors or other processing devices and execute the basic OS program 261 stored in the memory 260 in order to control the overall operation of the UE 114. For example, the main processor 240 could control the reception of forward channel signals and the transmission of reverse channel signals by the RF transceiver 210, the RX processing circuitry 225, and the TX processing circuitry 215 in accordance with well-known principles. In some embodiments, the main processor 240 includes at least one microprocessor or microcontroller.

The main processor 240 is also capable of executing other processes and programs resident in the memory 260. The main processor 240 can move data into or out of the memory 260 as required by an executing process. In some embodiments, the main processor 240 is configured to execute the applications 262 based on the OS program 261 or in response to signals received from eNBs, other UEs, or an operator. The main processor 240 is also coupled to the I/O interface 245, which provides the UE 114 with the ability to connect to other devices such as laptop computers and handheld computers. The I/O interface 245 is the communication path between these accessories and the main processor 240.

The main processor 240 is also coupled to the keypad 250 and the display unit 255. The operator of the UE 114 can use the keypad 250 to enter data into the UE 114. The display 255 can be a liquid crystal display or other display capable of rendering text and/or at least limited graphics, such as from web sites. The display 255 could also represent a touchscreen.

The memory 260 is coupled to the main processor 240. Part of the memory 260 could include a random access memory (RAM), and another part of the memory 260 could include a Flash memory or other read-only memory (ROM).

As noted above, the UE 114 could operate in a hybrid communication network in which the UE 114 communicates with eNBs 101-103 and with other UEs. As described in more detail below, the UE 114 supports a device-to-device communications protocol that, with the assistance of the eNBs, allows the UE 114 to establish communication links with the neighboring UEs (even UEs in different cells).

Although FIG. 2 illustrates one example of UE 114, various changes can be made to FIG. 2. For example, various components in FIG. 2 could be combined, further subdivided, or omitted and additional components could be added according to particular needs. As a particular example, the main processor 240 could be divided into multiple processors, such as one or more central processing units (CPUs) and one or more graphics processing units (GPUs). Also, while FIG. 2 illustrates the UE 114 configured as a mobile telephone or smartphone, UEs could be configured to operate as other types of mobile or stationary devices. In addition, various components in FIG. 2 could be replicated, such as when different RF components are used to communicate with the eNBs 101-103 and with other UEs.

Figure 3:
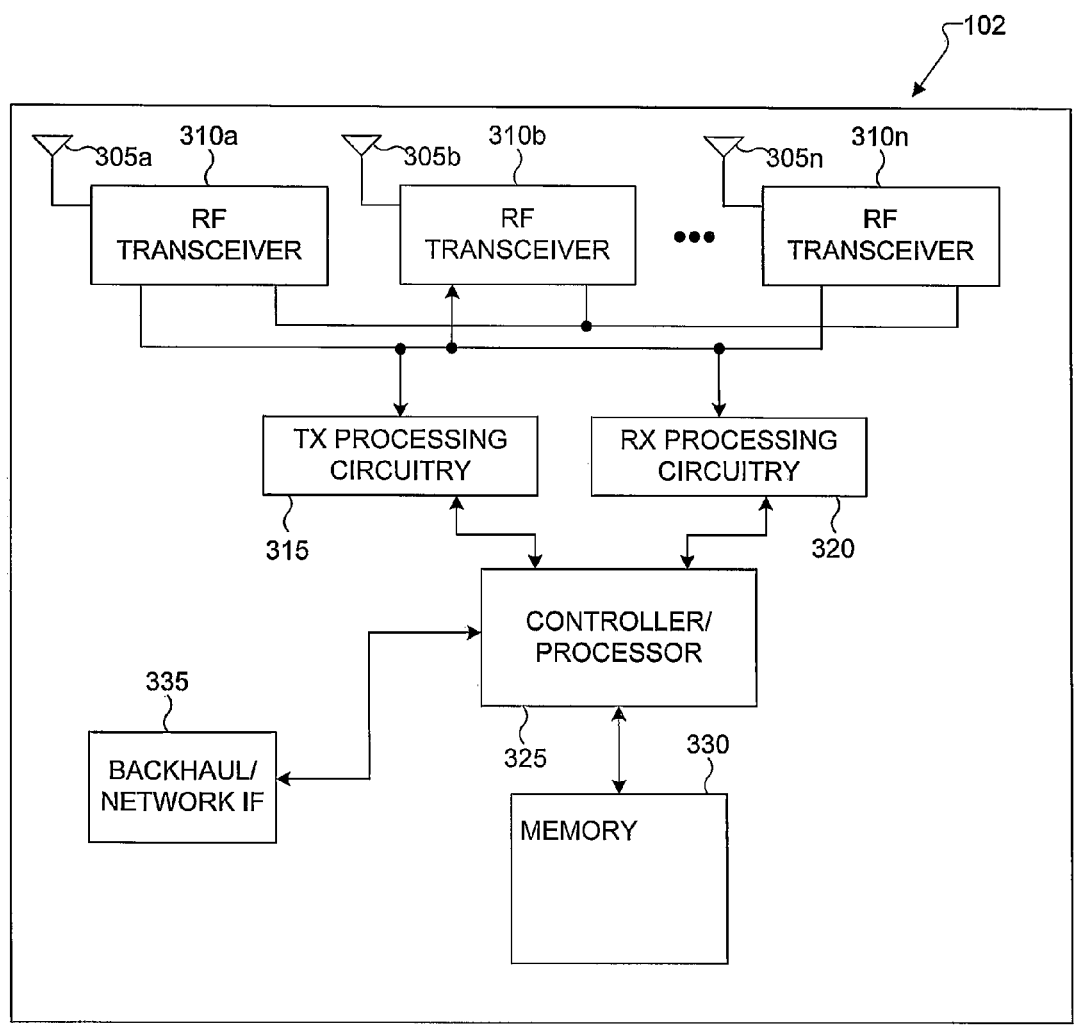
FIG. 3 illustrates an example eNodeB (eNB) according to this disclosure.

FIG. 3 illustrates an example eNB 102 according to this disclosure. The embodiment of the eNB 102 illustrated in FIG. 3 is for illustration only, and other eNBs of FIG. 1 could have the same or similar configuration. However, eNBs come in a wide variety of configurations, and FIG. 3 does not limit the scope of this disclosure to any particular implementation of an eNB.

As shown in FIG. 3, the eNB 102 includes multiple antennas 305a-305n, multiple RF transceivers 310a-310n, transmit (TX) processing circuitry 315, and receive (RX) processing circuitry 320. The eNB 102 also includes a controller/processor 325, a memory 330, and a backhaul or network interface 335.

The RF transceivers 310a-310n receive, from the antennas 305a-305n, incoming RF signals, such as signals transmitted by UEs or other eNBs. The RF transceivers 310a-310n down-convert the incoming RF signals to generate IF or baseband signals. The IF or baseband signals are sent to the RX processing circuitry 320, which generates processed baseband signals by filtering, decoding, and/or digitizing the baseband or IF signals. The RX processing circuitry 320 transmits the processed baseband signals to the controller/processor 325 for further processing.

The TX processing circuitry 315 receives analog or digital data (such as voice data, web data, e-mail, or interactive video game data) from the controller/processor 325. The TX processing circuitry 315 encodes, multiplexes, and/or digitizes the outgoing baseband data to generate processed baseband or IF signals. The RF transceivers 310a-310n receive the outgoing processed baseband or IF signals from the TX processing circuitry 315 and up-converts the baseband or IF signals to RF signals that are transmitted via the antennas 305a-305n.

The controller/processor 325 can include one or more processors or other processing devices that control the overall operation of the eNB 102. For example, the controller/processor 325 could control the reception of forward channel signals and the transmission of reverse channel signals by the RF transceivers 310a-310n, the RX processing circuitry 320, and the TX processing circuitry 315 in accordance with well-known principles. The controller/processor 325 could support additional functions as well, such as more advanced wireless communication functions. For instance, the controller/processor 325 could support beam forming or directional routing operations in which outgoing signals from multiple antennas 305a-305n are weighted differently to effectively steer the outgoing signals in a desired direction. Any of a wide variety of other functions could be supported in the eNB 102 by the controller/processor 325. In some embodiments, the controller/processor 325 includes at least one microprocessor or microcontroller.

The controller/processor 325 is also capable of executing programs and other processes resident in the memory 330, such as a basic OS. The controller/processor 325 can move data into or out of the memory 330 as required by an executing process.

The controller/processor 325 is also coupled to the backhaul or network interface 335. The backhaul or network interface 335 allows the eNB 102 to communicate with other devices or systems over a backhaul connection or over a network. The interface 335 could support communications over any suitable wired or wireless connection(s). For example, when the eNB 102 is implemented as part of a cellular communication system (such as one supporting 5G, LTE, or LTE-A), the interface 335 could allow the eNB 102 to communicate with other eNBs over a wired or wireless backhaul connection. When the eNB 102 is implemented as an access point, the interface 335 could allow the eNB 102 to communicate over a wired or wireless local area network or over a wired or wireless connection to a larger network (such as the Internet). The interface 335 includes any suitable structure supporting communications over a wired or wireless connection, such as an Ethernet or RF transceiver.

The memory 330 is coupled to the controller/processor 325. Part of the memory 330 could include a RAM, and another part of the memory 330 could include a Flash memory or other ROM.

As noted above, the eNB 102 could operate in a hybrid communication network in which UEs communicate with the eNBs 101-103 and with other UEs. As described in more detail below, the eNB 102 supports a network-assisted multi-cell device discovery protocol that, with the assistance of the eNBs 101-103, allows the UEs to discover neighboring UEs and to establish communication links with the neighboring UEs (even UEs in different cells).

Although FIG. 3 illustrates one example of an eNB 102, various changes can be made to FIG. 3. For example, the eNB 102 could include any number of each component shown in FIG. 3. As a particular example, an access point could include a number of interfaces 335, and the controller/processor 325 could support routing functions to route data between different network addresses. As another particular example, while shown as including a single instance of TX processing circuitry 315 and a single instance of RX processing circuitry 320, the eNB 102 could include multiple instances of each (such as one per RF transceiver). Also, various components in FIG. 3 could be combined, further subdivided, or omitted and additional components could be added according to particular needs.

Figure 4:
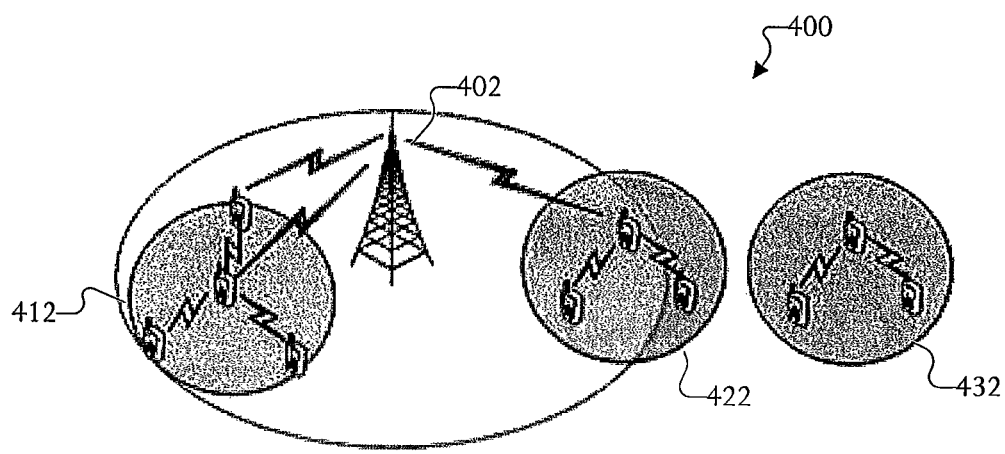
FIG. 4 illustrates an LTE device-to-device broadcast/groupcast communications protocol according to this disclosure.

FIG. 4 illustrates an LTE device-to-device broadcast/groupcast communications protocol 400 according to this disclosure. The embodiment of the LTE device-to-device broadcast/groupcast communications protocol 400 shown in FIG. 4 is for illustration only. Other embodiments could be used without departing from the scope of the present disclosure.

The D2D communication can be used to implement many kinds of services that are complementary to the primary communication network or provide new services based on the flexibility of the network topology. The LTE D2D multicast communication such as broadcasting or groupcasting has been identified as a potential means for D2D communication where UEs are able to transmit messages to all in-range D2D-enabled UEs or a subset of UEs which are members of particular group.

As illustrated in FIG. 4, two D2D communication groups 412 and 422 are within the communication range of eNB 402, and the D2D communication group 432 is outside of the communication rage of the eNB 402. The UEs of the groups 412 and 422 perform a network-assisted partial coverage D2D communications, and UEs of the group 432 perform out-of-network D2D communications. For example, future public safety networks are expected to require devices to operate in near simultaneous fashion when switching between cellular and D2D communication modes. As a result, there is a need for protocols which can manage D2D communication in these hybrid deployment scenarios.

Figure 5:
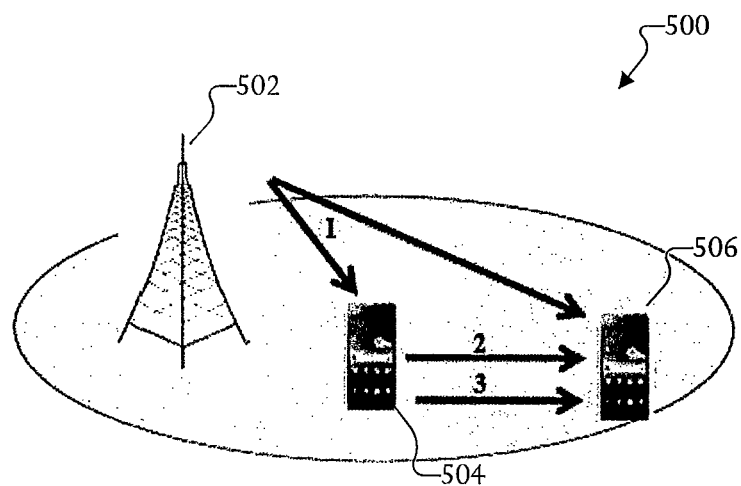
FIG. 5 illustrates a network-assisted partial coverage D2D communications protocol according to this disclosure.

FIG. 5 illustrates a network-assisted partial coverage D2D communications protocol 500 according to this disclosure. In the example shown in FIG. 5, the network includes an eNB 502 and two D2D enabled UEs 504, 506: UE1 502 which is within the communication range of the eNB 502 and UE2 506 which is outside the coverage of the cellular network. Although only two UEs are considered, the following description could be generalized to consider discovery between a plurality of UEs.

The eNB 502 can configure an in-network UE to perform as a relay using a D2D transmission channel due to knowledge of out-of-network D2D-enabled UEs (for example in the case of a D2D discovery protocol) or due to the implementation of an emergency broadcast service which utilizes configured in-network UEs as coverage-extending relays.

Group leader determination could be based upon preconfiguration, for example one device in a police precinct. Alternatively, group leader determination could be based upon determination that no other group leaders are active within the vicinity of a UE or group of UEs.

For example, a UE, such as UE 114, during the course of synchronization procedure, as previously described, can determine that neither network-based nor D2D UE-based sync signal is received. After determining that neither network-based nor D2D UE-based sync signal is received, the UE 114 can determine to initiate group-leader operation and transmit D2D sync and/or D2D SIB.

The embodiments disclosed herein can also apply for the operation wherein all or a fraction of the devices to engage in D2D communication are not within coverage of the cellular network. In this scenario, coordinated operation of the D2D protocol is desired in order to efficiently allocate resources and avoid potential interference issues. One method to implement this is through the operation of one of the out-of-coverage (OOC) UEs taking on much of the coordination and signaling provided the eNB in the case of full or partial network operation. All or multiple UEs can be capable of operation as a group leader, and the detailed procedure for group leader authorization and initiation is described in U.S. patent application Ser. No. 14/266,024, the disclosure of which is incorporated by reference in its entirety. Although only two UEs are illustrated, the following description could be generalized to consider discovery between a plurality of UEs.

Figure 6:
FIG. 6 illustrates an out-of-network D2D communications protocol according to this disclosure.

FIG. 6 illustrates an out-of-network D2D communications protocol 600 according to this disclosure. The embodiment of the out-of-network D2D communications protocol 600 shown in FIG. 6 is for illustration only. Other embodiments could be used without departing from the scope of the present disclosure.

FIG. 6 considers the operation wherein all of the devices to engage in D2D communication are not within coverage of the cellular network. In this scenario, coordinated operation of the D2D protocol is desired in order to efficiently allocate resources and avoid potential interference issues. One method to implement coordinated operation of the D2D protocol is through the operation of one of the OOC UEs 602-604 taking on much of the coordination and signaling provided by the eNB in the case of full or partial network operation. All or multiple UEs 602-604 can be capable of operation as a group leader.

The protocol for the in-network coverage or out-of-network coverage D2D transmission protocol is divided into three main phases: 1. Synchronization/Configuration, 2. D2D Control Transmission/Reception, and 3. D2D data channel transmission and reception. The detail descriptions on each phase are as follows.

D2D Synchronization

Timing synchronization must first be ensured so that the control and discovery signaling can be properly transmitted and received by in-coverage (IC) and out-of-coverage (OOC) devices. Several alternatives for achieving timing synchronization between UE1 and UE2 are considered: UE1 transmits a periodic synchronous signal (denoted as D2D sync signal) to UE2 based upon the primary synchronization signals and secondary synchronization signals (PSS/SSS) transmitted by the eNB; or UE1 transmits a compact periodic synchronous signal, which has a short duration and long periodicity and can cover the entire uplink or downlink bandwidth.

Control Channel Resource Allocation

A D2D communication channel corresponds to a given group or broadcast ID. In order for a D2D data channel (DDCH) transmission including a D2D broadcast channel (DBCH) to be received, a D2D transmission control channel (DCCH) is needed to be transmitted in addition to the reference symbols (RS) and data symbols. This control information can be separated from unicast cellular control information since the control information is only relevant for UEs participating in D2D communication.

In certain embodiments, the D2D control information for a given group or broadcast ID employs a unique DCCH. The group/broadcast IDs can be pre-configured, indicated by higher-layer configuration, or provided in a system information broadcast message. UEs can be capable to be configured to monitor or receive from multiple DCCHs. In another alternative, the control information for multiple groups or broadcast IDs can be mapped to the same DCCH.

A limited amount of DCCH information can be provided via system information broadcast. This primarily concerns the information needed to acquire the DCCH(s). For example, this information can be carried by means of a single D2D specific SystemInformationBlock: SystemInformationBlockTypeX (DSIB). For example, the time/frequency resources utilized for a given D2D channel can be divided into N D2D transmission resource blocks (DTRBs) transmitted in T dedicated D2D transmission resource slots (DTRS).

Figure 7:
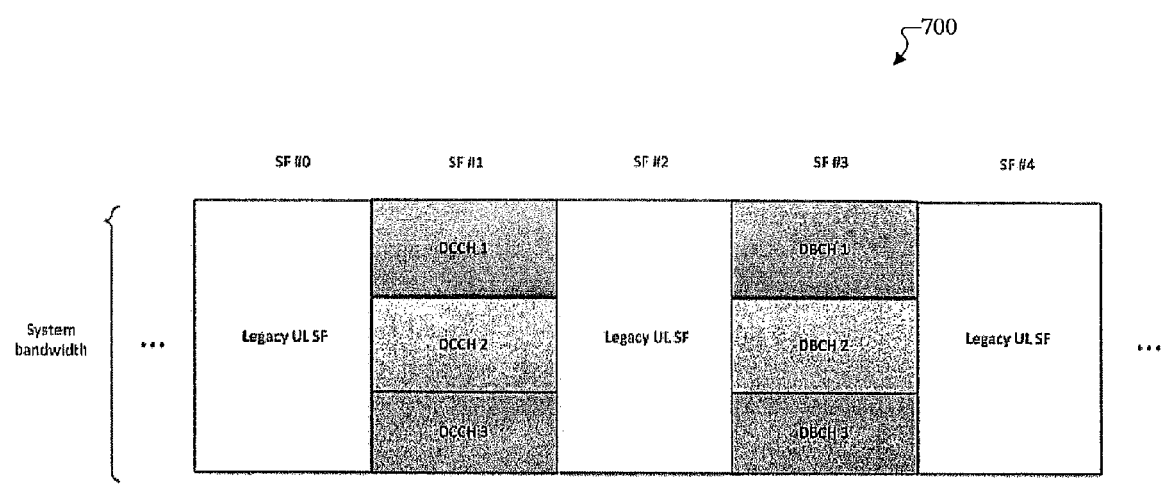
FIG. 7 illustrates an example of configured UL resources for multiple D2D control and broadcast transmission channels according to this disclosure.

FIG. 7 illustrates an example of configured UL resources 700 for multiple D2D control and broadcast transmission channels according to the present disclosure. The embodiment of configured UL resources for multiple D2D control and broadcast transmission channels in FIG. 7 is for illustration only. Other embodiments could be used without departing from the scope of the present disclosure.

In one example, a DTRB corresponds to a PRB pair and a DTRS corresponds to a subframe. As illustrated in the FIG. 7, a set of DTRBs (PRB-pairs) is reserved within an uplink D2D DTRS (subframe) for D2D transmission.

A UE that wishes to transmit a D2D control information (D2DCI) message on the DCCH must have allocated physical resources. Several embodiments for allocation of resources are considered.

In option 1-1, the resources allocated for the DCCH for a given UE are statically preconfigured by the network or another entity.

In option 1-2, the resources allocated for the DCCH are semi-statically or dynamically from a set of available DCCH resources:

In option 1-2A, the network or a cluster-head controller UE indicates the subset of available resources to be used by the UE for DCCH transmission. The indication can be semi-static via higher-layer signaling (e.g. DSIB) or dynamic (e.g. per DCCH transmission opportunity) via physical layer signaling.

In option 1-2B, the network or a cluster-head controller UE indicates a set of available resources from which the UE can select a subset to be used by the UE for DCCH transmission. The indication can be semi-static via higher-layer signaling (e.g. DSIB) or dynamic (e.g. per DCCH transmission opportunity) via physical layer signaling.

In option 1-2C, the UE can select a subset to be used for DCCH transmission without prior explicit indication of available resources.

Control Channel Design and Access

Depending on the method of resource allocation as discussed in the Control Channel Resource Allocation above, the UE needs to access the DCCH on the selected resources. In the case of pre-configuration or network or cluster head indication, the transmitting UE directly transmits during the time slots and at the frequency locations indicated. However, in the case of the options B and C, wherein the UE autonomously selects the resources collision between other UEs making similar resource allocation selections should be addressed to avoid resulting DCCH interference.

Figure 8:
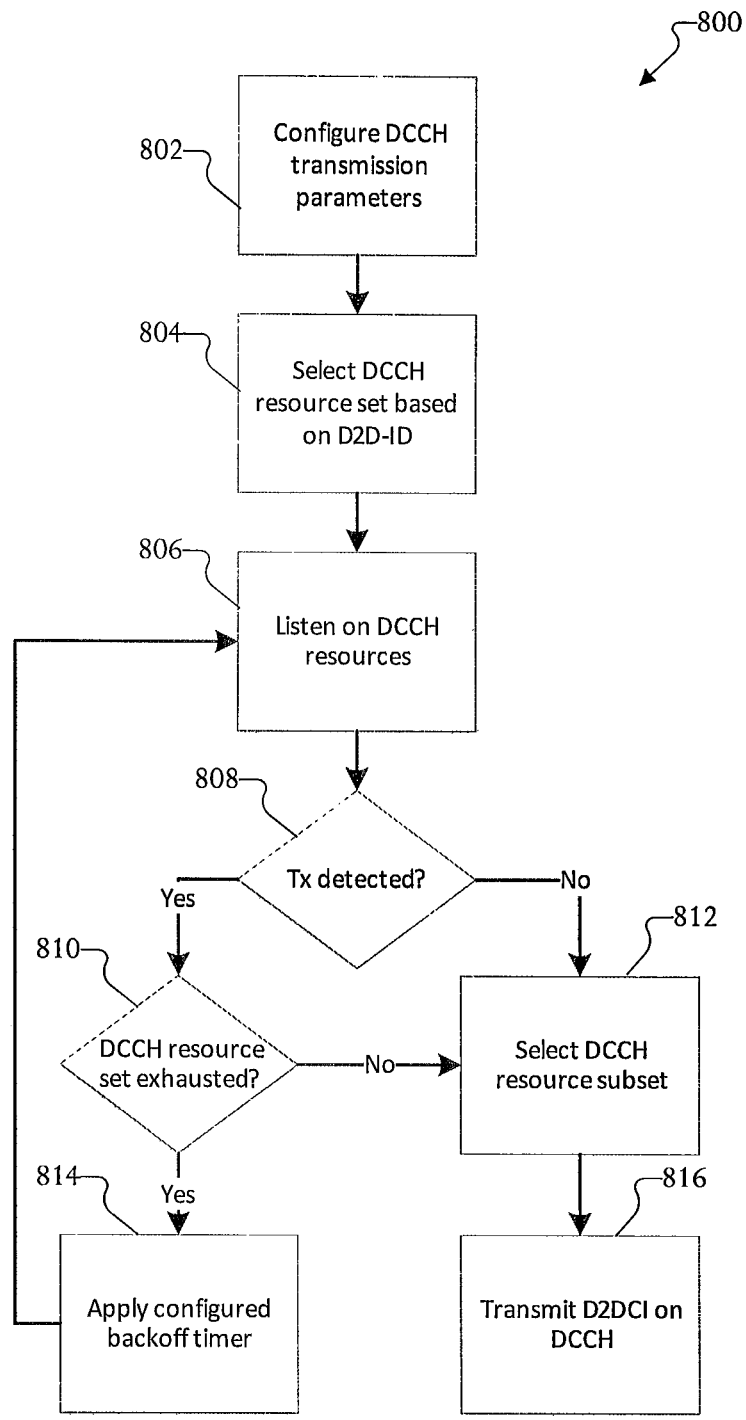
FIG. 8 depicts a flowchart for a contention-based control channel access protocol according to this disclosure.

FIG. 8 depicts a flowchart 800 for a contention-based control channel access protocol according to the present disclosure. While the signaling flow depicts a series of sequential signals, unless explicitly stated, no inference should be drawn from that sequence regarding specific order of performance, performance of signals or portions thereof serially rather than concurrently or in an overlapping manner, or performance of the signals depicted exclusively without the occurrence of intervening or intermediate signals. The process depicted in the example depicted is implemented by a transmitter chains in, for example, a mobile station and a base station.

Figure 9:
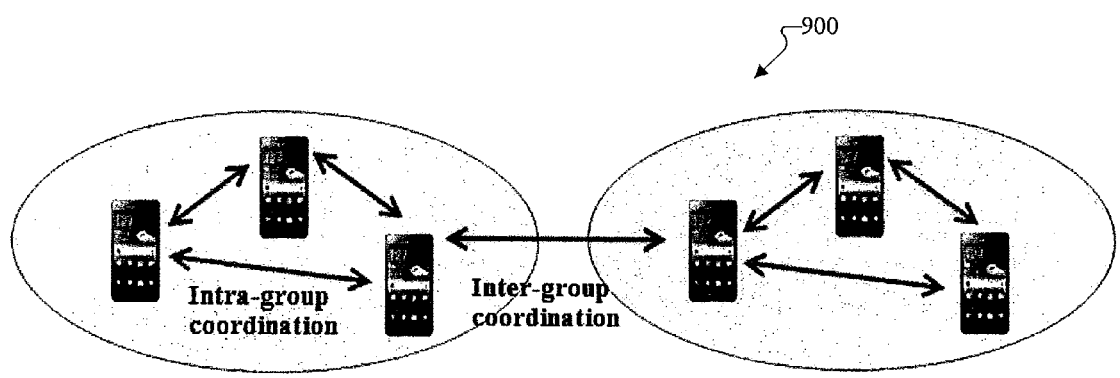
FIG. 9 illustrates an example scenario of inter- and intra-group resource coordination according to this disclosure.

In one embodiment, a contention-based control channel access operation is utilized by a UE before transmitting on the DCCH. The contention-based control channel access operation begins with the step 802, where a UE prepares to transmit on DCCH and configures the appropriate message and initializes the control channel access procedure. The amount of available resources for D2D broadcast operation may not be sufficient in scenarios where a large number of UEs are located in a dense location (public safety UEs responding to an emergency incident). As a result, due to time/frequency resource reuse, a large amount of interference or contention delay can be incurred, resulting in poor throughput performance. Especially in the scenario of groupcast operation, it is desirable to distinguish resource allocation within a group and resource allocation between UEs in different groups. FIG. 9 illustrates an example scenario of inter- and intra-group resource coordination.

In one embodiment, the initial set of possible DCCH resources are determined by the UE based upon the D2D-ID. For example, UEs can be organized into groups based on ID or a single ID representing a group of UEs can correspond to the D2D-ID. Based on this ID allocation, sets of available DCCH resources can be partitioned as in FIG. 7 for example. In one alternative this mapping can be preconfigured at the UE or indicated via higher layer signaling (e.g. DSIB).

Alternatively, if groupcast functionality is not present or only one set of DCCH resources are available for all UEs regardless of group association, the D2D-ID to resource set mapping may not be required. In this case the UE can directly consider the set(s) of resources without such an ID mapping. However, the ID mapping can be implemented in a way that is transparent from the UE perspective, wherein the UE is not aware of what other potential sets of resources may or may not be available other than those corresponding to its respective ID.

Once the UE has a configured set of potential DCCH resources, the UE listens on those resources in step 806. Next, in step 808, the UE determines if those resources are currently occupied by transmissions of other UEs. For example, using energy detection on the DCCH resources, the UE can infer the presence of other transmitting UEs. In another example, the UE can directly decode part or complete DCCH transmissions from other transmitting UEs. In another alternative, the UE listens to a subset of DCCH resources and infers the occupancy level for the entire set of resources based on the measurement or reception on the subset. This can decrease complexity and increase efficiency of the channel access operation.

In the case where no other transmissions are detected, or if the power of the detected transmissions are below a given threshold T_DCCH, a UE then selects a subset of the DCCH resources to transmit its control channel message in step 812. In one embodiment, the subset definition can be pre-defined/configured or indicated via higher layer signaling (DSIB).

In option 2-1, the subset can correspond to the entire set of the DCCH resources.

Option 2-2 corresponds the subset to a fixed set of DCCH resources. For example, the subset of DCCH resources can correspond to M TDRSs or M TDRBs with MP=N, where P is the number of subsets and N is the number of TDRS or TDRBs corresponding to a DCCH resource set. The subsets can be further indexed according to frequency (e.g. lowest to highest in frequency) or time (earliest or latest timeslot)

In option 2-2A, the subset selection can start from the lowest index and continuously selects the next consecutive index; in option 2-2B, the subset selection can start from the highest index and continuously select the previous consecutive index; in option 2-2C, the subset selection can start from a randomly selected index and continuously select the next or previous consecutive index; and in option 2-2D, the subset selection can start from an index j_dcch where j_dcch can be configured based on a higher layer configuration or based on a unique value (e.g. D2D ID), and continuously select the next or previous consecutive index.

Once the resource subset is selected according to one of the above alternatives, the UE transmits the configured D2DCI in step 816.

Alternatively, in the case where the UE listens on potentially available DCCH resources and detects the presence of other UEs, for example, if the power of the detected transmissions is above a given threshold T_DCCH, the following alternatives are envisioned.

If all resources are determined to be occupied in step 810, the UE determines that channel access cannot succeed and configures a backoff timer in step 814. The backoff timer can indicate a number of time units or slots wherein the UE will not attempt to contend for the control channel in order to attempt to avoid further collisions. The value of the backoff timer can be preconfigured or indicated via higher layer signaling.

If for some resources Tx was not detected or if the power of the detected transmissions on those resources are below a given threshold T_DCCH, the UE can indicate those resources as unoccupied and select a subset of the unoccupied resources for DCCH transmission in step 812. One of option 2-1 and options 2-2A through 2-2D can be applied to the set of unoccupied resources. For example, indexing based selection rules will skip the subsets that are not in indicated as unoccupied.

In step 816, one UE transmits a D2DCI on a selected set of DCCH resources to another UE.

Time/Frequency Hopping

As mentioned previously, the allocation of control or data resources can correspond to a subset of time/frequency resource blocks. In one method of operation, the frequency and time-slot pattern remains constant across the broadcast transmission. However, to provide frequency diversity and interference avoidance, time/frequency hopping can be utilized.

Figure 10:
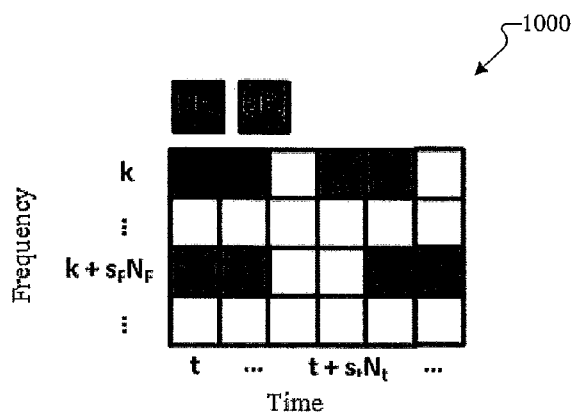
FIG. 10 illustrates an example time/frequency hopping pattern for two UEs broadcast transmission resources according to this disclosure.

FIG. 10 illustrates an example time/frequency hopping pattern for two UEs broadcast transmission resources, where a frequency shift and a time shift are applied. The embodiment of the time/frequency hopping pattern in FIG. 10 is for illustration only. Other embodiments could be used without departing from the scope of the present disclosure.

In option 3-1, the time/frequency hopping pattern can be expressed as a series of shifts relative to a starting frequency resource k (e.g. DTRB) and a starting time slot t (e.g. DTRS). In one example the frequency shift can be expressed as $k+s_F N_F$, where $s_F$ is the applied multiple of $N_F$ frequency resource blocks. Similarly the time shift can be expressed as a multiple $s_t$ of $N_t$ transmission instances. Alternately, more generally, the frequency shift and time shift can be expressed as a single value (e.g. only the product of $s_F N_F$ or $s_t N_t$).

In order to correctly decode all messages for which the above resource allocation methods are applied, a common understanding between transmitting and receiving UEs of the applied time/frequency hopping pattern is needed. In one embodiment, the time frequency hopping pattern can be indicated to the UE by explicitly providing the resources of all of the transmission resource blocks. In one alternative, the resource blocks are indicated as a field in the D2DCI. In another alternative, subsets of resources can be indicated to correspond to one or more transmission instances.

In option 3-1-1, the time/frequency hopping parameters can be indicated instead of the complete time/frequency resource allocation pattern. This is beneficial in reducing the overall amount of control overhead required. The set of indicated parameters which can be configured include the reference starting frequency and/or transmission instance, frequency shift (e.g. $s_F$ and $N_F$), and time shift (e.g. $s_t$ and $N_t$). TABLE 1 gives an example of various fields conveying the relevant parameters. A set of time/frequency hopping parameters set forth in TABLE 1 indicates the time/frequency hopping pattern.

Various combinations of parameters can be envisioned depending on the total complexity of the time/frequency hopping and some parameters can be implicitly determined or preconfigured. Additionally the parameters considered by configured independently or jointly.

TABLE 1

| Field | Description |
|---|---|
| Reference starting DTRB | |
| $k = \{0, \ldots N_{DTRB} - 1\}$ | Location of reference frequency DTRB (out of $N_{DTRB}$ available) |
| Reference starting DTRS (optional) | |
| $t = \{0, \ldots N_{DTRS} - 1\}$ | Location of reference frequency DTRS (out of $N_{DTRS}$ available) |

TABLE 1-continued

| Field | Description |
|---|---|
| Frequency shift granularity | |
| $N_F = \{1, \ldots N_{DTRB}\}$ | Number of resources allocated for a given hopping instance |
| Frequency shift multiple | |
| $s_F = \{-N_F/N_{DTRB}, \ldots N_F/N_{DTRB}\}$ | Factor of $N_F$ DTRBs relative to reference DTRB k |
| Frequency shift periodicity | |
| $\{1, \ldots 4\}$ | Number of transmission instances for which the frequency hopping pattern is applied |
| Time shift granularity | |
| $N_t = \{1, \ldots N_{DTRB}\}$ | Number of resources allocated for a given hopping instance |
| Time shift multiple | |
| $s_t = \{-N_t/N_{DTRS}, \ldots, N_t/N_{DTRS}\}$ | Factor of $N_t$ DTRBs relative to reference DTRB t |
| Time shift periodicity | |
| $\{1, \ldots 4\}$ | Number of transmission instances for which the time hopping pattern is applied |

In addition, multiple methods of configuring the relevant time/frequency hopping parameters are described below.

In option 3-1-2, the parameters, such as the ones described in TABLE 1 can be preconfigured at the UE or statically configured by the network. In another alternative, the parameters can be conveyed via semi-static higher layer signaling (e.g. RRC).

In option 3-1-3, the parameters can be configured by the UE autonomously. For example sets of time/frequency parameters can correspond to a range of D2D ID values. TABLE 2 gives an example D2D-ID based hopping pattern mapping.

TABLE 2

| D2D ID values | $N_t, s_t$ | $N_F, s_F$ |
|---|---|---|
| 0-255 | {1, 2} | {5, 2} |
| 256-511 | {1, 2} | {5, -2} |
| 512-767 | {1, 3} | {5, -2} |
| 768-1023 | {1, 3} | {5, -2} |

In option 3-1-4, the parameters can be implicitly selected/configured based on the subset of transmission resources selected based on the above Control Channel Design Access. For example, subsets of resources can be mapped to sets of time/frequency hopping parameters. TABLE 3 gives an example mapping wherein DTRB/DTRS sets are mapped to hopping parameters.

TABLE 3

| DTRB/DTRS | $N_t, s_t$ | $N_F, s_F$ |
|---|---|---|
| 0, 0 | {1, 2} | {5, 2} |
| 0, 1 | {1, 2} | {5, -2} |
| 1, 0 | {1, 3} | {5, 2} |
| 1, 1 | {1, 3} | {5, -2} |

In option 3-1-5, a combination of parameter indication/configurations can be utilized. For example, multiple parameters can be configured via higher layer signaling, while another set is implicitly determined by mapping tables which are preconfigured or provided by higher layer signaling.

In option 3-2, the alternative hopping mapping pattern resource allocation can be based upon an index set and a predefined symmetric frequency hopping across transmission slots. Each allocation is associated with an index m, where m can take a value {0, . . . N_DRB-1}. If a UE is allocated index m in time slot t, in time slot t+1 the user will be allocated with the frequency symmetric DRB of the time t allocation, where the symmetric axis is given by [$N_{DRB}/2$] (i.e. DRBs {0, 1 . . . N_DRB/2-2, N_DRB/2-1} and {N_DRB-1, N_DRB-2 . . . N_DRB/2+1, N_DRB/2} represent symmetric sets if N_DRB is even and {0, 1 . . . N_DRB/2-2, N_DRB/2-1}{N_DRB-1, N_DRB-2 . . . N_DRB/2+1} if N_DRB is odd and {[$N_{DRB}/2$]} is a self-symmetric set (i.e. no frequency hopping between time slots). TABLE 4 gives an example hopping pattern for two time slots and N_DRB=4 in the D2D broadcast communication.

TABLE 4

| m = 3 | m = 0 |
|---|---|
| m = 2 | m = 1 |
| m = 1 | m = 2 |
| m = 0 | m = 3 |
| t = 0 | t = 1 |

In option 3-3, the mapping can be from index m in slot t to index m_hop in slot t+1. In one example if m is even m_hop=m+1 and if m is odd m_hop=m-1. In another example m_hop=N_DRB-1-m. For example if N_DRB=4, this gives the same hopping pattern as in FIG. 8.

In option 3-4, the number of RBs per DRB can be mapped according to:

$$N_{RB}^{DRB} = \left\lfloor \frac{(N_{RB}^{Total} - \tilde{N}_{RB}^{UL})}{N_{DRB}} \right\rfloor \quad \text{(Eq. 1)}$$

where $N_{RB}^{Total}$ represents the total number of RBs in the system bandwidth and $\tilde{N}_{RB}^{UL}$ represents the total number of RBs not used by D2D operation. For example if PUCCH only is multiplexed with D2D then $N_{RB}^{UL} = \tilde{N}_{RB}^{PUCHH}$ if $\tilde{N}_{RB}^{PUCCH}$ is even, and $\tilde{N}_{RB}^{PUCCH}+1$ if $NRB^{PUCCH}$ is odd. If D2D and other cellular operations are not time-multiplexed then $\tilde{N}_{RB}^{UL}=0$ or is not included in this or any subsequent related equations.

In order to determine the RBs allocated for a given D2D UE based on the above partitioning, a first index $i_{PRB}^{D2D}$ is indicated to the UE according to any of the prior indicated methods for resource allocation. For example, the options 2-2A through 2-2C can apply where $i_{PRB}^{D2D}$ represents the UE-selected index (or is mapped to $i_{PRB}^{D2D}$ by a preconfigured mapping. In the case of the option 2-2D, $i_{PRB}^{D2D}$ can be directly correspond to j_dcch explicitly or can be implicitly derived from j_dcch if j_dcch is mapped to a a single or set of preconfigured values of $i_{PRB}^{D2D}$.

For a given slot t the allocation is given by:

$$n_{PRB}^{D2D}(t) = \quad \text{(Eq. 2)}$$
$$\left(i_{PRB}^{D2D} - \left\lceil \frac{\tilde{N}_{RB}^{UL}}{2} \right\rceil + f_{hop}(t)N_{RB}^{DRB}\right) \mod(N_{RB}^{DRB}N_{DRB}) + \left\lceil \frac{\tilde{N}_{RB}^{UL}}{2} \right\rceil$$

where $$f_{hop}(t) = \quad \text{(Eq. 3)}$$
$$\begin{cases} 0, & N_{DRB} = 1 \\ (f_{hop}(t-1) + \Delta f_{hop}(t)) \mod N_{DRB}, & N_{DRB} = 2 \\ (f_{hop}(t-1) + \Delta f_{hop}(t)) \mod(N_{DRB}-1)+1) \mod N_{DRB}, & N_{DRB} > 2 \end{cases}$$

where $\Delta f_{hop}$ is a hopping offset given by as $$\Delta f_{hop}(t) = (\Sigma_{k=10t+1}^{10t+9} c(k) 2^{k-(10t+1)}) \mod(N_{DRB}-1),$$
$$\Delta f_{hop}(-1)=0 \quad \text{(Eq. 4)}$$

where the PN-sequence c(k) provides randomization and independent hopping for users by being initialized as c_int=D2DID.

In option 3-4, in addition to frequency hopping, mirroring can be applied to further increase randomization of resource allocation between UEs. The value of the mirroring function $f_m t$ is based upon c(k):

$$f_m(t) = \begin{cases} t \mod 2 & N_{DRB} = 1 \\ c(10t) & N_{DRB} > 1 \end{cases} \quad \text{(Eq. 5)}$$

In the case of mirroring, the resource allocation for time slot t is given by:

$$n_{PRB}^{D2D}(t) = \quad \text{(Eq. 6)}$$
$$\left(i_{PRB}^{D2D} - \left\lceil \frac{\tilde{N}_{RB}^{UL}}{2} \right\rceil + f_{hop}(t)N_{RB}^{DRB} + \Delta f_m(t)\right) \mod(N_{RB}^{DRB}N_{DRB}) +$$
$$\left\lceil \frac{\tilde{N}_{RB}^{UL}}{2} \right\rceil$$

where $$\Delta f_m(t) = \left((N_{RB}^{DRB} - 1) - 2\left(\left(i_{PRB}^{D2D} - \left\lceil \frac{\tilde{N}_{RB}^{UL}}{2} \right\rceil\right) \mod N_{RB}^{DRB}\right)\right) f_m(t). \quad \text{(Eq. 7)}$$

TABLE 5 gives an example of time/frequency hopping and mirroring pattern according to the above option 3-3 and option 3-4 for $N_{RB}^{Total}=12$, $N_{RB}^{DRB}=3$, $N_{DRB}=4$. For simplicity, only three RBs within the Discovery Resource Blocks (DRBs) are marked with bracketed numbers to indicate the hopping between the two slots.

TABLE 5

| DRB = 0, RB = 0 [1] | DRB = 0, RB = 0 |
|---|---|
| DRB = 0, RB = 1 | DRB = 0, RB = 1 [2] |
| DRB = 0, RB = 2 | DRB = 0, RB = 2 |
| DRB = 1, RB = 3 | DRB = 1, RB = 3 [3] |
| DRB = 1, RB = 4 | DRB = 1, RB = 4 |
| DRB = 1, RB = 5 | DRB = 1, RB = 5 |
| DRB = 2, RB = 6 | DRB = 2, RB = 6 [1] |
| DRB = 2, RB = 7 [2] | DRB = 2, RB = 7 |
| DRB = 2, RB = 8 | DRB = 2, RB = 8 |
| DRB = 3, RB = 9 | DRB = 3, RB = 9 |
| DRB = 3, RB = 10 | DRB = 3, RB = 10 |
| DRB = 3, RB = 11 [3] | DRB = 3, RB = 11 |
| t = 0 | t = 1, $f_{hop}$ = 1, $f_m$ = 1 |

Resource Allocation Indication

The time and/or frequency hopping parameters can be indicated to the receiving UEs by one of the following options.

In option 4-1, parameters can be indicated in fields contained in the D2DCI.

In option 4-2, the hopping pattern can be indicated in a higher layer control message (e.g. MAC scheduling).

In option 4-3, the parameters can be implicitly indicated. For example, if the control message is received on a given subset of DTRB/DTRS, the receiving UE can determine a mapping between those resources and the subsequent time/frequency hopping pattern.

In option 4-4, the parameters can be a function of the D2D Identification (ID).

In option 4-5, the parameters can be statically preconfigured by the network or hardcoded.

The applicability of frequency/time hopping methods described can be for both and control and data channels. In one alternative, the parameters and configurations can be jointly applied. However since control and data reception can be decoupled and require different levels of robustness, different hopping configurations can be applied to control and data channels.

In option 4-6, one or more higher layer configuration parameters are indicated by higher layer signaling (e.g. RRC) hoppingD2D can indicate to the UE whether a given time/frequency configuration is applied.

In option 4-6A, one or more higher layer configuration parameters are indicated for control and data channels are indicated separately by higher layer signaling (e.g. RRC). In this case dcchHoppingD2D can indicate to the UE whether a given time/frequency configuration is applied for the control channel while dbchHoppingD2D can indicate to the UE whether a given time/frequency configuration is applied for the data channel.

In option 4-6B, one or more higher layer configuration parameters are used for control channel hopping pattern indication and the hopping pattern indication for the data channel is indicated separately by L1 signaling (e.g. MAC or D2DCI). This potentially provides a transmitting UE with more flexibility to adapt to changing interference or environments.

In option 4-6C, one or more higher layer configuration parameters are used for frequency hopping pattern indication and separate parameters are used for time hopping pattern indication. Any of the previous alternatives concerning separate or joint indication for control and data channels can also be combined in this case. For example four parameters could be configured for a UE: dcchFreqHoppingD2D, dcchTimeHoppingD2D, dbchFreqHoppingD2D, dbchTimeHoppingD2D.

It should be noted that any of the above indications can directly indicate whether a pattern is applied and also indicate directly or with dependent subfields the exact values of relevant time/frequency hopping parameters. Alternatively the configuration parameters can indicate whether a particular time/frequency hopping pattern is applied as well as an index which maps to a set of parameter values. In a further alternative, the configuration parameters can only indicate whether time/frequency hopping is applied and values of the parameters are indicated by another method or are preconfigured at the UE.

The following embodiment describes a complete broadcast operation procedure combining the previously described methods. In this embodiment, a single UE1 will transmit a broadcast message which is received by UE2 while both devices are outside of network coverage. It can be understood that in this example does not preclude constructing further exemplary embodiments from different combinations of the above methods.

Step 1 is synchronization and initialization: in this step, UEs are initially configured with D2DIDs and group associations as well as obtaining an indication of reserved frequency bandwidth and subframes for D2D operation. Synchronization is assumed to be obtained between the two UEs either by an internal or external timing reference (e.g. sync signals from UE1 to UE2).

Step 2 is control channel access: UE1 determines to transmit a broadcast message and first determines resources for transmitting on the control channel. UE1 listens on the preconfigured set of control channel resources and based on the absence or presence of a control channel beacon transmitted by other UEs selects a subset of resources for transmitting a control channel. Based on the selected subset a frequency/time hopping pattern is configured for determining the exact resource allocation necessary to transmit the control information.

Step 3 is control channel reception: UE2 is preconfigured with a set of potential resources where a UE can transmit control information. Based on this preconfiguration, UE2 searches over the entire set for any control channel transmissions and detects the transmission of UE1 and can decode the entire transmission based on the common understanding of the frequency/time hopping pattern implicitly indicated by UE2.

Step 4 is data channel transmission: UE1 subsequently transmits on selected data channel resources and initializes and applies the data channel frequency/time hopping pattern based on its D2DID (which was broadcast to UE2 in the D2DCI in the step 1.

Step 5 is data channel reception: UE2 is able to decode the data channel transmissions of UE1 by following the time/frequency hopping pattern implicitly indicated by UE1 by broadcasting the D2DID in the control channel information received in the step 2.

It can be also contemplated that various combinations or sub-combinations of the specific features and aspects of the embodiments may be made and still fall within the scope of the appended claims. For example, in some embodiments, the features, configurations, or other details disclosed or incorporated by reference herein with respect to some of the embodiments are combinable with other features, configurations, or details disclosed herein with respect to other embodiments to form new embodiments not explicitly disclosed herein. All of such embodiments having combinations of features and configurations are contemplated as being part of the present disclosure. Additionally, unless otherwise stated, no features or details of any of the embodiments disclosed herein are meant to be required or essential to any of the embodiments disclosed herein, unless explicitly described herein as being required or essential.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method, comprising:
    scheduling at least one resource for a Device-to-Device (D2D) transmission control channel (DCCH) carrying a D2D control information (D2DCI) message;
    transmitting, by a first UE, the DCCH on the at least one DCCH resource to at least one second UE;
    scheduling at least one resource for a D2D data channel (DDCH);
    transmitting, by the first UE, the DDCH on the at least one DDCH resource to the at least one second UE, wherein the DCCH is transmitted according to a time and frequency hopping pattern based on a hopping parameter;

listening, by the first UE, on a configured set of potential resources for the DCCH to detect a transmission by another UE;

in a case where the transmission by another UE is not detected, or a power of the transmission by another UE is below a given threshold, selecting, by the first UE, a subset of the set of potential DCCH resources as the at least one DCCH resource; and in a case where the transmission by another UE is detected, or the power of the transmission by another UE is above the given threshold, configuring a backoff timer indicating a number of time units or slots during which the first UE will not attempt to contend for the at least one DCCH resource.

2. The method of claim 1, wherein the DDCH comprises a D2D broadcast channel (DBCH).

3. The method of claim 1, wherein the subset of the set of potential DCCH resources is predefined or configured or indicated via higher layer signaling.

4. The method of claim 1, wherein subsets of the set of potential DCCH resources are indexed in an order of frequency, and the subset selection starts from one of: the lowest index, the highest index, a randomly selected index, and an index that is configured based on a higher layer configuration or a D2D identification (ID).

5. The method of claim 1, wherein at least one of the DCCH and the DDCH is configured according to a time and frequency hopping pattern defined by time and frequency hopping parameters.

6. The method of claim 5, wherein sets of the time and frequency hopping parameters correspond to ranges of D2D ID values.

7. The method of claim 5, wherein either of a higher layer and a L1 layer signals one or multiple higher layer configuration parameters indicating whether each of the DCCH and DDCH have a time and frequency hopping pattern separately.

8. The method of claim 7, wherein the multiple configuration parameters comprise a first higher layer configuration parameter indicating whether a time and frequency hopping configuration applies to the DCCH, and a second higher layer configuration parameter indicating whether a time and frequency hopping configuration applies to the DDCH.

9. The method of claim 7, wherein the multiple higher layer configuration parameters comprise a frequency hopping pattern indicator and a time hopping pattern indicator for DCCH, and a time hopping pattern indicator and a frequency hopping pattern indicator for DDCH.

10. A user equipment (UE) configured for D2D communications, the UE comprising:
one or multiple antenna; and
a processing circuitry configured to:
schedule at least one resource for a Device-to-Device (D2D) transmission control channel (DCCH) carrying a D2D control information (D2DCI) message;
transmit the DCCH on the at least one DCCH resource, to at least one second UE through the one or more multiple antenna;
schedule at least one resource for a D2D data channel (DDCH); and
transmit the DDCH on the at least one DDCH resource, to the at least one second UE, wherein the DCCH is transmitted according to a time and frequency hopping pattern based on a hopping parameter;

listen through the one or multiple antenna on a configured set of potential resources for the DCCH to detect a transmission by another UE;

in a case where the transmission by another UE is not detected, or a power of the transmission by another UE is below a given threshold, select a subset of the set of potential DCCH resources as the at least one DCCH resource; and in a case where the transmission is detected, or the power of the transmission is above the given threshold, configure a backoff timer indicating a number of time units or slots during which the UE will not attempt to contend for the DCCH.

11. The UE of claim 10, wherein the DDCH comprises a D2D broadcast channel (DBCH).

12. The UE of claim 10, wherein the subset of the set of potential DCCH resources is predefined or configured or indicated via higher layer signaling.

13. The UE of claim 10, wherein subsets of the set of potential DCCH resources are indexed in an order of frequency, and the subset selection starts from one of: the lowest index, the highest index, a randomly selected index, and an index that is configured based on a higher layer configuration or a D2D identification (ID).

14. The UE of claim 10, wherein at least one of the DCCH and the DDCH is configured according to a time and frequency hopping pattern defined by time and frequency hopping parameters.

15. The UE of claim 14, wherein sets of the time and frequency hopping parameters correspond to ranges of D2D ID values.

16. The UE of claim 14, wherein either of a higher layer and a L1 layer signals one or multiple higher layer configuration parameters indicating whether each of the DCCH and DDCH have a time and frequency hopping pattern separately.

17. The UE of claim 16, wherein the multiple configuration parameters comprise a first higher layer configuration parameter indicating whether a time and frequency hopping configuration applies to the DCCH, and a second higher layer configuration parameter indicating whether a time and frequency hopping configuration applies to the DDCH.

18. The UE of claim 16, wherein the multiple higher layer configuration parameters comprise a frequency hopping pattern indicator and a time hopping pattern indicator for DCCH, and a time hopping pattern indicator and a frequency hopping pattern indicator for DDCH.

19. A user equipment (UE) configured for D2D communications, the UE comprising:
one or more multiple antenna; and
a processing circuitry configured to:
receive at least one resource for a Device-to-Device (D2D) transmission control channel (DCCH) carrying a D2D control information (D2DCI) message through the one or more multiple antenna from a first UE;
receive at least one resource for a D2D data channel (DDCH) based on DCCH through the one or more multiple antenna from the first UE, wherein the at least one resource is received by the UE from the first UE based on the first UE:
listening, by the first UE, on a configured set of potential resources for the DCCH to detect a transmission by the UE;

in a case where the transmission by the UE is not detected, or a power of the transmission by the UE is below a given threshold, selecting, by the first UE, a subset of the set of potential DCCH resources as the at least one DCCH resource; and in a case where the transmission by the UE is detected, or the power of the transmission by the UE is above the given threshold, configuring a backoff timer indicating a number of time units or slots during which the first UE will not attempt to contend for the at least one DCCH resource; and demodulate and decode at least one DDCH resource, using the D2DCI message, wherein the DCCH is received according to a time and frequency hopping pattern based on a hopping parameter.

20. The UE of claim 19, wherein at least one of the DCCH and the DDCH is configured according to a time and frequency hopping pattern defined by time and frequency hopping parameters.

21. The UE of claim 19, wherein sets of the time and frequency parameters correspond to ranges of D2D ID values.

22. The UE of claim 19, wherein either of a higher layer and a L1 layer signals one or multiple higher layer configuration parameters indicating whether each of the DCCH and DDCH have a time and frequency hopping pattern separately.

23. The UE of claim 22, wherein the multiple configuration parameters comprise a first higher layer configuration parameter indicating whether a time and frequency hopping configuration applies to the DCCH, and a second higher layer configuration parameter indicating whether a time and frequency hopping configuration applies to the DDCH.

24. The UE of claim 22, wherein the multiple higher layer configuration parameters comprise a frequency hopping pattern indicator and a time hopping pattern indicator for DCCH, and a time hopping pattern indicator and a frequency hopping pattern indicator for DDCH.

* * * * *